(12) United States Patent
Oertli et al.

(10) Patent No.: US 8,623,170 B2
(45) Date of Patent: Jan. 7, 2014

(54) MOISTURE-CURING COMPOSTION WITH IMPROVED INITIAL STRENGTH

(75) Inventors: Marcel Oertli, Zürich (CH); Daniele Rutz, Zürich (CH); Barbara Jucker, Zürich (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/305,524

(22) Filed: Nov. 28, 2011

(65) Prior Publication Data

US 2012/0298300 A1    Nov. 29, 2012

Related U.S. Application Data

(63) Continuation of application No. PCT/EP2010/057296, filed on May 27, 2010.

(30) Foreign Application Priority Data

May 27, 2009 (EP) .................................. 09161265

(51) Int. Cl.
   *C09J 183/08*    (2006.01)
   *B32B 37/12*     (2006.01)

(52) U.S. Cl.
   USPC ................... 156/329; 525/440.03; 524/588

(58) Field of Classification Search
   None
   See application file for complete search history.

(56) References Cited

U.S. PATENT DOCUMENTS

| | | | |
|---|---|---|---|
| 3,971,751 A | 7/1976 | Isayama et al. | |
| 4,408,021 A | 10/1983 | Penn | |
| 4,424,244 A | 1/1984 | Puskadi | |
| 4,434,126 A | 2/1984 | McGary, Jr. et al. | |
| 4,474,933 A | 10/1984 | Huber et al. | |
| 6,008,305 A | 12/1999 | Wang et al. | |
| 6,048,579 A | 4/2000 | Wang et al. | |
| 6,207,766 B1 | 3/2001 | Doi et al. | |
| 6,310,170 B1 | 10/2001 | Johnston et al. | |
| 6,375,789 B1 | 4/2002 | Katz et al. | |
| 6,525,162 B1 | 2/2003 | Altounian | |
| 6,749,943 B1 * | 6/2004 | Tangen et al. ................ | 428/447 |
| 6,967,226 B2 | 11/2005 | Shah | |
| 7,019,074 B2 | 3/2006 | Nakamura et al. | |
| 7,674,840 B2 | 3/2010 | Stanjek et al. | |
| 7,771,622 B2 * | 8/2010 | Zhou ............................. | 252/511 |
| 8,012,302 B2 | 9/2011 | Jucker et al. | |
| 8,207,252 B2 | 6/2012 | Huang et al. | |
| 2003/0051610 A1 | 3/2003 | Dux et al. | |
| 2004/0143034 A1* | 7/2004 | Primke et al. ................. | 523/176 |
| 2006/0142532 A1* | 6/2006 | Wintermantel et al. ........ | 528/59 |
| 2006/0155045 A1 | 7/2006 | Tsuno et al. | |
| 2007/0088137 A1* | 4/2007 | Georgeau et al. ............. | 525/487 |
| 2007/0100111 A1 | 5/2007 | Stanjek et al. | |
| 2008/0058492 A1 | 3/2008 | Griswold | |
| 2008/0125539 A1* | 5/2008 | Mack ............................. | 524/588 |
| 2008/0221245 A1 | 9/2008 | Huang et al. | |
| 2008/0293908 A1 | 11/2008 | Ludewig et al. | |
| 2009/0131591 A1* | 5/2009 | Schindler et al. .............. | 525/105 |
| 2009/0156737 A1* | 6/2009 | Schindler et al. .............. | 524/588 |
| 2010/0040894 A1* | 2/2010 | Rosenau et al. ............... | 428/447 |
| 2012/0298299 A1 | 11/2012 | Rutz et al. | |

FOREIGN PATENT DOCUMENTS

| | | |
|---|---|---|
| EP | 0 096 250 A1 | 12/1983 |
| EP | 0 202 491 A2 | 11/1986 |
| EP | 202491 A2 * | 11/1986 |
| EP | 0 354 472 A1 | 2/1990 |
| WO | WO 02/48228 A2 | 6/2002 |
| WO | WO 2004/005420 A1 | 1/2004 |
| WO | WO 2007/096355 A1 | 8/2007 |
| WO | WO 2008/027496 A2 | 3/2008 |

OTHER PUBLICATIONS

International Search Report (PCT/ISA/210) issued on Aug. 20, 2010, by European Patent Office as the International Searching Authority for International Application No. PCT/EP2010/057296.
Written Opinion (PCT/ISA/237) issued on Aug. 20, 2010, by European Patent Office as the International Searching Authority for International Application No. PCT/EP2010/057296.
Copending U.S. Appl. No. 13/305,473 naming Daniele Rutz, Marcel Oertli, and Barbara Jucker as inventors and filed on Nov. 28, 2011.
International Search Report (PCT/ISA/210) issued on Aug. 3, 2010, by European Patent Office as the International Searching Authority for International Application No. PCT/EP2010/057295.
Written Opinion (PCT/ISA/237) issued on Aug. 3, 2010, by European Patent Office as the International Searching Authority for International Application No. PCT/EP2010/057295.

* cited by examiner

*Primary Examiner* — Robert S Loewe
(74) *Attorney, Agent, or Firm* — Buchanan Ingersoll & Rooney PC

(57) ABSTRACT

A composition including: i) at least one moisture-reactive silane-functional polymer which is liquid at room temperature; and ii) at least one silane-functional polyester of formula (I):

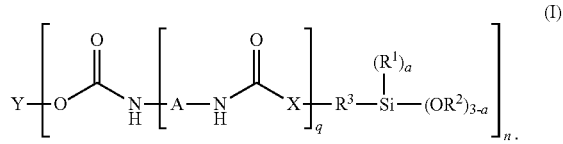

21 Claims, No Drawings

MOISTURE-CURING COMPOSTION WITH IMPROVED INITIAL STRENGTH

RELATED APPLICATIONS

This application claims priority as a continuation application under 35 U.S.C. §120 to PCT/EP2010/057296, which was filed as an International Application on May 27, 2010 designating the U.S., and which claims priority to European Application No. 09161265.5 filed in Europe on May 27, 2009. The entire contents of these applications are hereby incorporated by reference in their entireties.

FIELD

Disclosed are moisture-curing compositions based on silane-functional polymers, which are suitable as adhesives, sealants or coatings, and which can present improved initial strengths.

BACKGROUND INFORMATION

For many applications, it can be desirable to use moisture-curing compositions, as adhesives, sealants or coatings which have a high initial strength. For example, adhesives with low initial strength can have the disadvantage that the parts joined by means of the adhesive have to be held in position until a certain strength has built up, so that they remain in the desired position.

Various preparations for preparing moisture-curing compositions with high initial strengths can be used. The use of two-component compositions or reactive warm or hot melt compositions, for example, warm or hot melt adhesive compositions, so-called warm or hot melts, can be used. A combination of both preparations can also be used.

Warm or hot melt adhesives can present the disadvantage that their viscosity increases very strongly immediately after the application. As a result, corrections in the orientation, for example, of two substrates to be bonded, can only be possible with difficulty after the joining. Moreover, these adhesives can be insufficiently resilient for many applications to compensate for thermal expansions.

Besides pure warm or hot melt adhesives, in which the moisture-reactive components are completely or at least mostly in the form of solid components at room temperature, warm or hot melt substances are known, in which only a portion of the moisture-reactive components is solid at room temperature. Said substances generally also contain, besides a liquid, reactive component, a reactive or nonreactive melt component. To obtain compositions that present optimal mechanical properties, reactive melt components, for example, are available in a very broad spectrum. For moisture-curing compositions based on silane-functional polymers, one uses, as reactive melt components, the reaction products of any polyols with polyisocyanates, which are then reacted with amino- or mercaptosilanes. Such a composition is described, for example, in WO 2004/005420 A1.

However, moisture-curing compositions can have an improvement potential with a view to the achieved initial strength, adhesive properties, and with regard to the mechanical properties of the cured compositions.

SUMMARY

According to an exemplary aspect, disclosed is a composition, comprising:

i) at least one moisture-reactive silane-functional polymer which is liquid at room temperature; and
ii) at least one silane-functional polyester of formula (I):

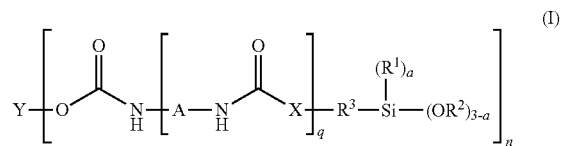

wherein

Y stands for an n-valent residue of a polyester P which is solid at room temperature and terminated by hydroxyl groups, after removal of n hydroxyl groups;

$R^1$ stands for a linear or branched, monovalent hydrocarbon residue having 1-12 C atoms, which optionally presents one or more C—C multiple bonds and/or optionally cycloaliphatic and/or aromatic portions;

$R^2$ stands for an acyl residue or for a linear or branched, monovalent hydrocarbon residue having 1-12 C atoms, which optionally comprises one or more C—C multiple bonds and/or optionally cycloaliphatic and/or aromatic portions;

$R^3$ stands for a linear or branched, bivalent hydrocarbon residue having 1-12 C atoms, which optionally comprises cyclic and/or aromatic portions, and optionally one or more heteroatoms;

the variable a stands for a value of 0, 1 or 2;
the variable n stands for a value of 1-3;
A stands for a bivalent residue of a diisocyanate after removal of the two isocyanate groups;
the variable q stands for a value of 0 or 1; and
X stands for S or for $NR^5$
wherein
$R^5$ stands for a hydrogen atom or for a linear or branched, monovalent hydrocarbon residue having 1-20 C atoms, which optionally comprises cyclic portions, or for a residue of formula (II):

$R^6$ and $R^7$, independently of each other, stand for a hydrogen atom or for a residue selected from the group consisting of —$R^{11}$, —$COOR^{11}$ and —CN; and $R^8$ stands for a hydrogen atom or for a residue selected from the group consisting of —$CH_2$—$COOR^{11}$, —$COOR^{11}$, $CONHR^{11}$, —$CON(R^{11})_2$, —CN, —$NO_2$, —$PO(OR^{11})_2$, —$SO_2R^{11}$ and —$SO_2OR^{11}$, and $R^{11}$ stands for a hydrocarbon residue having 1-20 C atoms, which optionally comprises one or more heteroatoms.

According to another exemplary aspect, disclosed is a method for bonding two substrates S1 and S2, the method comprising:

i) applying an exemplary composition on a substrate S1 and/or a substrate S2;
ii) contacting the substrates S1 and S2 via the applied composition within an open time of the composition; and
iii) curing the composition with water,
wherein the substrates S1 and S2 are identical to or different from each other.

According to another exemplary aspect, disclosed is a method for bonding, sealing or coating, the method comprising:
i) applying an exemplary composition on a substrate S1 and/or between two substrates S1 and S2; and
ii) curing the composition with water,
wherein the substrates S1 and S2 are identical to or different from each other.

According to another exemplary aspect, disclosed is a two-component composition, comprising:
a component A comprising an exemplary composition; and
a component B comprising water.

DETAILED DESCRIPTION

Provided are moisture-curing compositions which are suitable for use as, for example, adhesives, sealants or coatings, and can have improved initial strengths.

According to an exemplary aspect, a moisture-reactive silane-functional polymer which is liquid at room temperature can be combined with a specific silane-functional polyester in order to obtain a moisture-curing composition with improved initial strength.

An exemplary advantage of an exemplary composition is the significantly elevated elasticity modulus in case of small expansions, a property which, in the case of compositions based on silane-functional polymers, is as a rule clearly inferior to known compositions, for example, based on polyurethanes.

According to an exemplary first aspect, a composition is provided comprising
i) at least one moisture-reactive silane-functional polymer which is liquid at room temperature; as well as
ii) at least one silane-functional polyester of formula (I)

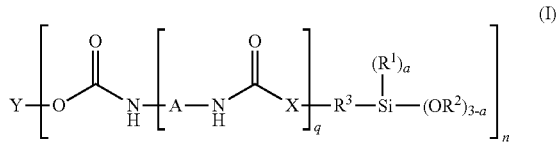

Here, Y stands for an n-valent residue of a polyester P end-capped with hydroxyl groups, which is solid at room temperature, after the removal of n hydroxyl groups.

The residue $R^1$ stands for a linear or branched, monovalent hydrocarbon residue having 1-12 C atoms, which optionally has one or more C—C multiple bonds and/or optionally cycloaliphatic and/or aromatic portions. For example, $R^1$ stands for a methyl, ethyl or isopropyl group.

The residue $R^2$ stands for an acyl residue or for a linear or branched, monovalent hydrocarbon residue having 1-12 C atoms, which optionally presents one or more C—C multiple bonds and/or optionally cycloaliphatic and/or aromatic portions. The residue $R^2$ advantageously stands for an acyl or alkyl group having 1-5 C atoms, for example, for a methyl or for an ethyl or for an isopropyl group.

The residue $R^3$ stands for a linear or branched, bivalent hydrocarbon residue having 1-12 C atoms, which optionally has cyclic and/or aromatic portions, and optionally one or more heteroatoms. The residue $R^3$ advantageously stands for an alkylene residue having 1-3 C atoms, for example, 3 C atoms.

Moreover, the index a stands for a value of 0, 1 or 2, for example, for 0 or 1.

The index n stands for a value of 1-3, for example, for 2.

The residue A stands for a bivalent residue of a diisocyanate after the removal of the two isocyanate groups.

The index q stands for a value of 0 or 1, for example, for 0.

The residue X stands for S or for $NR^5$, where the residue $R^5$ stands for a hydrogen atom or for a linear or branched, monovalent hydrocarbon residue having 1-20 C atoms, which optionally presents cyclic portions, or for a residue of formula (II).

The residues $R^6$ and $R^7$ here stand independently of each other for a hydrogen atom or for a residue from the group consisting of —$R^{11}$, —$COOR^{11}$ and —CN.

Moreover, the residue $R^8$ stands for a hydrogen atom or for a residue from the group consisting of —$CH_2$—$COOR^{11}$, —$COOR^{11}$, $CONHR^{11}$, —$CON(R^{11})_2$, —CN, —$NO_2$, —PO$(OR^{11})_2$, —$SO_2R^{11}$ and —$SO_2OR^{11}$.

The residue $R^{11}$ stands for a hydrocarbon residue having 1-20 C atoms, which optionally has one or more heteroatoms.

Within a silane group in the polyester of formula (I), $R^1$ and $R^2$, independently of each other, stand for the described residues. Thus, for example, polyesters of formula (I) with end groups are also possible, wherein the end groups are ethoxydimethoxysilane end groups ($R^2$=methyl, $R^2$=methyl, $R^2$=ethyl).

Substance names starting with "poly," such as, polyol or polyisocyanate, in the present document refer to substances which contain formally two or more of the functional groups that occur in their name per molecule.

In the present document, the term "polymer" comprises, on the one hand, a group of chemically uniform macromolecules which differ, however, with regard to the polymerization degree, molecular weight and chain length, which group was produced by a polyreaction (polymerization, polyaddition, polycondensation). The term "polymer" comprises, on the other hand, also derivatives of such a group of macromolecules from polyreactions, that is compounds which were obtained by reactions, for example, additions or substitutions, of functional groups on existing macromolecules, and which may be chemically uniform or not. The term, moreover, also comprises so-called prepolymers, that is reactive oligomer preadducts whose functional groups participate in the synthesis of macromolecules.

The term "polyurethane polymer" comprises all the polymers which are prepared according to the so-called diisocyanate polyaddition method. This also includes polymers which are nearly or completely free of urethane groups. Examples of polyurethane polymers are polyether polyurethanes, polyester polyurethanes, polyether polyureas, polyureas, polyester polyureas, polyisocyanurates, and polycarbodiimides.

In the present document, the terms "silane" or "organosilane" denote compounds which, on the one hand, have at least one, usually two or three, alkoxy groups or acyloxy groups bound via Si—O bonds directly to the silicon atom, and, on the other hand, at least one organic residue bound via a Si—C bond directly to the silicon atom. Such silanes are known to the person skilled in the art as organoalkoxysilanes or organoacyloxysilanes.

Similarly, the term "silane group" denotes the silicon-containing group bound to the organic residue of the silane, which is bound via the Si—C bond. The silanes, respectively their silane groups, have the property of hydrolyzing in contact with moisture. In the process, organosilanols form, that is silicon organic compounds containing one or more silanol groups (Si—OH groups), and, by subsequent condensation reactions, organosiloxanes form, that is silicon organic compounds containing one or more siloxane groups (Si—O—Si groups).

The term "silane-functional" denotes compounds comprising silane groups. "Silane-functional polymers" accordingly are polymers comprising at least one silane group.

The terms "aminosilanes" or "mercaptosilanes" denote organosilanes whose organic residue comprises an amino group or a mercapto group. The term "primary aminosilanes" is used to denote aminosilanes which comprise a primary amino group, that is an $NH_2$ group which is bound to an organic residue. The term "secondary aminosilanes" is used to denote aminosilanes which comprise a secondary amino group, that is a NH group which is bound to two organic residues.

The term "molecular weight" in the present document always denotes the average molecular weight $M_n$ (number average).

In the present document, substances are referred to as "solid" if their shape undergoes no change without outside influence, or which can be deformed only with difficulty, and which, however, are, for example, not capable of flowing. Similarly, substances are considered "liquid" if they can be deformed and are capable of flowing, which also includes highly viscous and pasty substances.

"Room temperature" in the present document denotes a temperature of 23° C.

For example, suitable, hydroxyl group end-capped, polyesters P are polyesters which are prepared by known methods, for example, the polycondensation of hydroxycarboxylic acids or the polycondensation of aliphatic and/or aromatic polycarboxylic acids with bivalent or polyvalent alcohols.

For example, suitable are polyester polyols which are prepared from bivalent to trivalent alcohols, such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the above-mentioned alcohols with organic dicarboxylic acids or their anhydrides or esters, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid, trimellitic acid anhydride or mixtures of the above-mentioned acids, as well as polyester polyols made of lactones, for example, ε-caprolactone.

For example, suitable are polyester diols which are prepared from adipic acid, azelaic acid, sebacic acid, dodecanedicarboxylic acid, dimer fatty acid, phthalic acid, isophthalic acid and terephthalic acid as dicarboxylic acid or from lactones, such as, for example, c-caprolactone, and from ethylene glycol, diethylene glycol, neopentyl glycol, 1,4-butanediol, 1,6-hexanediol, dimer fatty acid diol, and 1,4-cyclohexanedimethanol as bivalent alcohol.

The polyester P with end-capping hydroxyl groups is, for example, a crystalline polyester.

The polyester P can, for example, have an average molecular weight $M_n$ of >2500 g/mol to 7000 g/mol. An exemplary average molecular weight $M_n$ of the polyester P is in the range from 3500 g/mol to 6000 g/mol.

In the exemplary molecular weight range, the polyesters P have improved crystallization properties, in comparison to chain-lengthened polyesters or polyesters with non-homogeneous molecular weight distribution, which lead to an exemplary composition presenting an improved initial strength at the time of its application.

If the polyester P is a crystalline polyester, the crystallization point of the polyester P is, for example, less than 30° C. below the melting point of the polyester P.

Compositions containing a reactive melt component which is based on the polyester P, wherein the crystallization point of the polyester P is less than 30° C. below the melting point of the polyester P, can be employed, because as a result the time span from the application of the composition with the applied molten melt component, to the achievement of a sufficient initial strength caused by crystallization of the melt component, can be shortened. Thus, for example, substrates, which are bonded to each other with an adhesive based on compositions containing a reactive melt component, do not need to be held in position, or only for a brief time, until a sufficient initial strength of the adhesive is achieved, so that they do not shift with respect to each other. This can be advantageous in the case of vertical bonding, for example, when bonding the wind shield of a vehicle or of a transport means.

Silane-functional polyesters of formula (I), where the index q stands for a value of 0, and which are consequently exemplary, can be obtained typically by reacting an isocyanatosilane IS of formula (II) with an above-described polyester P.

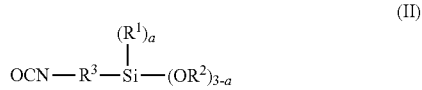

(II)

$R^1$, $R^2$, $R^3$ and a have already been described above.

This reaction occurs in the stoichiometric ratio of the isocyanate groups to th9 hydroxyl groups of the polyester P of 1:1, or with a slight excess of hydroxyl groups, for example, at temperatures from 20° C. to 100° C., optionally with the combined use of catalysts.

Examples of suitable isocyanatosilanes IS of formula (II) are 3-isocyanatopropyltrimethoxysilane, 3-isocyanatopropyldimethoxymethylsilane, and their analogs with ethoxy or isopropoxy groups instead of the methoxy groups on the silicon.

Silane-functional polyesters of formula (I), where the index q stands for a value of 1, can be obtained typically by reacting an above-described polyester P with a stoichiometric excess of dissocyanate of formulas OCN-A-NCO and subsequent reaction of the reaction product so formed with an aminosilane or a mercaptosilane of formula (III), in a quantity such that no isocyanate groups remain.

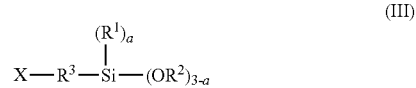

(III)

X, $R^1$, $R^2$, $R^3$ and a have already been described above.

For example, the mentioned reaction product is reacted with an aminosilane of formula (IV), where the residues $R^1$, $R^2$, $R^3$, $R^5$ and a have already been described above.

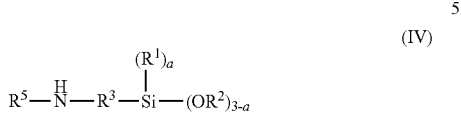
(IV)

Commercial diisocyanates are suitable as diisocyanates of formula OCN-A-NCO.

Suitable diisocyanates are, for example, 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane-1,3-diisocyanate, cyclohexane-1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis-(1-isocyanato-1-methylethyl)-naphthaline, 2,4- and 2,6-toluoylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthaline-1,5-diisocyanate (NDI), 3,3'-dimethyl-4,4'-diisocyanatodiphenyl (TODD, oligomers and polymers of the above-mentioned isocyanates, as well as any mixtures of the above-mentioned isocyanates.

Exemplary diisocyanates of formula OCN-A-NCO for the preparation of the silane-functional polyester of formula (I), are IPDI, TDI and MDI.

Examples of suitable aminosilanes of formula (IV) are primary aminosilanes, such as, 3-aminopropyltrimethoxysilane, 3-aminopropyldimethoxymethylsilane; secondary aminosilanes, such as, N-butyl-3-aminopropyltrimethoxysilane, N-phenyl-3-aminopropyltrimethoxysilane; the products of the Michael-like addition of primary aminosilanes, such as, 3-aminopropyltrimethoxysilane or 3-aminopropyldimethoxymethylsilane to Michael acceptors, such as, acrylonitrile, acrylic and methacrylic acid esters, acrylic or methacrylic acid amides, maleic acid and fumaric acid diesters, citraconic acid diesters, and itaconic acid diesters, for example, N-(3-trimethoxysilylpropyl)aminosuccinic acid dimethyl and diethyl esters; as well as analogs of the mentioned aminosilanes with ethoxy or isopropoxy groups instead of the methoxy groups on the silicon. For example, suitable, as aminosilanes, are secondary aminosilanes, for example, aminosilanes where $R^5$ in formula (IV) is different from H. Michael-like adducts are exemplary, for example, N-(3-trimethoxysilylpropyl)aminosuccinic acid diethyl ester.

The term "Michael acceptor" in the present document denotes compounds which, due to the double bonds contained in them, which are activated by electron acceptor residues, are capable of entering with primary amino groups ($NH_2$ groups) into nucleophilic addition reactions analogous to the Michael addition (hetero-Michael addition).

The proportion of silane-functional polyesters of formula (I) is, for example, 0.5-10 wt %, for example, 1-8 wt %, of the total composition.

The moisture-reactive silane-functional polymer which is liquid at room temperature is, for example, a silane-functional polymer STP which has end groups of formula (V).

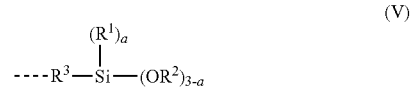
(V)

$R^1$, $R^2$, $R^3$ and a have already been described above.

In a first embodiment, the moisture-reactive silane-functional polymer STP is a silane-functional polyurethane polymer STP1, which can be prepared by reacting a silane which comprises at least one group which is reactive with respect to isocyanate groups, with a polyurethane polymer which comprises isocyanate groups. This reaction is, for example, carried out using a stoichiometric ratio of the groups which are reactive with respect to isocyanate groups to the isocyanate groups of 1:1, or with a slight excess of groups reactive with respect to isocyanate groups, so that the resulting silane-functional polyurethane polymer STP1 is completely free of isocyanate groups.

The silane, which usually has a group which is reactive with respect to isocyanate groups, is, for example, a mercaptosilane or an aminosilane of formula (III), for example, an aminosilane of formula (IV), as already described above.

For the preparation of a silane-functional polyurethane polymer STP1, it is suitable to use, as isocyanate group comprising polyurethane polymer, for example, polymers which can be prepared by reacting at least one polyol with at least one polyisocyanate, for example, a diisocyanate. This reaction can be carried out by reacting the polyol and the polyisocyanate by the usual methods, for example, at temperatures from 50° C. to 100° C., optionally with the combined use of appropriate catalysts, where the polyisocyanate is dosed in such a manner that its isocyanate groups are present in a stoichiometric excess with respect to the hydroxyl groups of the polyol.

For example, the excess of polyisocyanate is chosen in such a manner that, in the resulting polyurethane polymer, after the reaction of all the hydroxyl groups of the polyol, the remaining content of free isocyanate groups is 0.1-5 wt %, for example, 0.1-2.5 wt %, for example, 0.2-1 wt %, with respect to the total polymer.

The polyurethane polymer can optionally be prepared with the combined use of softeners, where the softeners used contain no groups that are reactive with respect to isocyanates.

Polyurethane polymers can be used having the mentioned content of free isocyanate groups which are prepared by reacting diisocyanates with high molecular weight diols in an NCO:OH ratio of 1.5:1 to 2:1.

Suitable polyols are, for example, polyether polyols, polyester polyols, and polycarbonate polyols as well as mixtures of these poylols.

As polyether polyols, which are also referred to as polyoxyalkylene polyols or oligoetherols, it can be suitable to use those that are polymerization products of ethylene oxide, 1,2-propylene oxide, 1,2- or 2,3-butylene oxide, oxetane, tetrahydrofuran or mixtures thereof, optionally polymerized with the help of a starter molecule with two or more active hydrogen atoms, such as, for example, water, ammonia, or compounds with several OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the mentioned compounds. One may use either polyoxyalkylene polyols having a low unsaturation degree (measured according to ASTM D-2849-69 and reported in milliequivalent unsaturation per gram polyol (mEq/g)), prepared, for example, with the help of so-called double metal cyanide complex catalysts (DMC catalysts), and also polyoxyalkylene polyols with higher unsaturation degree, prepared, for example, with the help of anionic catalysts, such as NaOH, KOH, CsOH or alkali alcoholates.

For example, suitable are polyoxyethylene polyols and polyoxypropylene polyols, for example, polyoxyethylenediols, polyoxypropylenediols, polyoxyethylenetriols and polyoxypropylenetriols.

For example, suitable are polyoxyalkylenediols or polyoxyalkylenetriols with an unsaturation degree of less than 0.02 mEq/g and a molecular weight in the range from 1000 to 30,000 g/mol, as well as polyoxyethylenediols, polyoxyethylenetriols, polyoxypropylenediols and polyoxypropylenetriols with a molecular weight from 400 to 8000 g/mol.

So-called ethylene oxide end-capped ("EO-end-capped", ethylene oxide end-capped) polyoxypropylene polyols are also, for example, suitable. The latter are special polyoxypropylenepolyoxyethylene polyols which are prepared, for example, by further alkoxylation of pure polyoxypropylene polyols, for example, polyoxypropylenediols and -triols, after the completion of the polypropoxylation reaction, with ethylene oxide, which as a result comprise primary hydroxyl groups. In this case, polyoxypropylene polyoxyethylenediols and polyoxypropylene polyoxyethylenetriols are exemplary.

Also suitable are styrene acrylonitrile grafted polyether polyols, for example, those available commercially under the trade name Lupranol® from the company Elastogran GmbH, Germany.

Suitable polyester polyols are, for example, polyesters, described above as polyester P, where the molecular weight of these polyester polyols, which are used for the preparation of the silane-functional polymer P, is selected in such a manner that the polyester polyols are liquid at room temperature.

Suitable polycarbonate polyols are, for example, those that can be prepared by reacting, for example, the above-mentioned alcohols, used for the synthesis of the polyester polyols, with dialkyl carbonates, such as, dimethyl carbonate, diaryl carbonates, such as, diphenyl carbonate or phosgene. Polycarbonate diols, for example, amorphous polycarbonate diols, are, for example, suitable.

Additional suitable polyols are poly(meth)acrylate polyols.

Also suitable are polyhydroxy functional fats and oils, for example, natural fats and oils, for example, castor bean oil, or so-called oleochemical polyols prepared by chemical modification of natural fats and oils; the epoxy polyesters or epoxy polyethers prepared, for example, by epoxidation of unsaturated oils and subsequent ring opening with carboxylic acids or alcohols, or polyols obtained by hydroformylation and hydrogenation of unsaturated oils. Moreover, there are polyols which are obtained from natural fats and oils by degradation processes, such as, alcoholysis or ozonolysis, and subsequent chemical linking, for example, by transesterification or dimerization of the degradation products or derivatives thereof so obtained. Suitable degradation products of natural fats and oils are, for example, fatty acids and fatty alcohols as well as fatty acid esters, for example, methyl esters (FAME), which can be derivatized, for example, by hydroformylation and hydrogenation to hydroxy fatty acid esters.

Also suitable are, moreover, polyhydrocarbon polyols, also referred to as oligohydrocarbonols, for example, polyhydroxy-functional ethylene propylene, ethylene butylenes or ethylene propylene diene copolymers, as prepared, for example, by the company Kraton Polymers, USA, or polyhydroxy-functional copolymers made of dienes, such as, 1,3-butanediene, or diene mixtures, and vinyl monomers, such as, styrene, acrylonitrile or isobutylene, or polyhydroxy-functional polybutadiene polyols, for example, those which are prepared by copolymerization of 1,3-butadiene and allyl alcohol, or by oxidation of polybutadiene, and which may also be hydrogenated.

Also suitable are polyhydroxy-functional acrylonitrile/butadiene copolymers, as prepared, for example, from epoxides or amino alcohols and carboxyl end-capped acrylonitrile/butadiene copolymers (commercially available under the name Hypro® CTBN from the company Emerald Performance Materials, LLC, USA).

These mentioned polyols, for example, have an average molecular weight of 250-30,000 g/mol, for example, 1000-30,000 g/mol, and a mean OH functionality in the range from 1.6 to 3.

For example, suitable polyols are polyether polyols, for example, polyoxyethylene polyol, polyoxypropylene polyol and polyoxypropylene polyoxyethylene polyol, for example, polyoxyethylenediol, polyoxypropylenediol, polyoxyethylenetriol, polyoxypropylenetriol, polyoxypropylene polyoxyethylenediol and polyoxypropylene polyoxyethylenetriol.

In addition to these mentioned polyols, small quantities of low molecular weight bivalent or polyvalent alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecandioles, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as, xylitol, sorbitol or mannitol, sugars, such as, sucrose, other higher valence alcohols, low molecular weight alkoxylation products of the above-mentioned bivalent or polyvalent alcohols, as well as mixtures of the above-mentioned alcohols, in the manufacture of the polyurethane polymer comprising isocyanate groups.

As polyisocyanates for the preparation of the polyurethane polymer, commercial aliphatic, cycloaliphatic or aromatic polyisocyanates, for example, diisocyanates of formula OCN-A-NCO, as described above, can be used.

For example, suitable silane-functional polymers STP1 are commercially available under the trade names Polymer ST50 from the company Hanse Chemie AG, Germany, as well as under the trade name Desmoseal® from the company Bayer MaterialScience AG, Germany.

The silane-functional polymer STP, in a second embodiment, is a silane-functional polyurethane polymer STP2 which can be prepared by reacting an isocyanatosilane IS of formula (II), as described above, with a polymer which comprises functional end groups which are reactive with respect to isocyanate groups, said end groups being, for example, hydroxyl groups, mercapto groups and/or amino groups. This reaction occurs using the stoichiometric ratio of isocyanate groups to the functional end groups which are reactive with respect to isocyanate groups of 1:1, or with a slight excess of the functional groups which are reactive with respect to isocyanate groups, at temperatures of, for example, 20-100° C., optionally with the combined use of catalysts.

The polymer, for example, presents hydroxyl groups as functional end groups which are reactive with respect to isocyanate groups.

Suitable polymers comprising hydroxyl groups are, on the one hand, the already mentioned high molecular weight polyoxyalkylene polyols, for example, polyoxypropylenediols having an unsaturation degree of less than 0.02 mEq/g and a molecular weight in the range from 4000 to 30,000 g/mol, for example, those having a molecular weight in the range from 8000 to 30,000 g/mol.

On the other hand, polyurethane polymers comprising hydroxyl groups, for example, end-capped hydroxyl groups, are also suitable for the reaction with isocyanatosilanes IS. Such polyurethane polymers can be prepared by reacting at least one polyisocyanate with at least one polyol. This reaction can be carried out by reacting the polyol and the polyisocyanate by the usual methods, for example, at temperatures of 50-100° C., optionally with the combined use of suitable catalysts, wherein the polyol is dosed in such a manner that its hydroxyl groups are present in stoichiometric excess with respect to the isocyanate groups of the polyisocyanate. It is, for example, to use a ratio of hydroxyl groups to isocyanate groups of 1.3:1 to 4:1, for example, 1.8:1 to 3:1. Optionally, the polyethane polymer can be prepared with the combined use of softeners, where the softeners used, in an exemplary embodiment, do not contain any groups which are reactive with respect to isocyanates. The same polyols and polyisocyanates mentioned already as suitable for preparing an isocyanate group comprising polyurethane polymer are suitable for this reaction, said polymer being used for preparing a silane-functional polyurethane polymer STP1.

For example, suitable silane-functional polymers STP2 are commercially available under the trade names SPUR® 1010LM, 1015LM and 1050MM from the company Momentive Performance Materials Inc., USA, as well as under the trade names Geniosil® STP-E15, STP-10 and STP-E35 from the company Wacker Chemie AG, Germany.

In a third embodiment, the silane-functional polymer STP is a silane-functional polymer STP3 which can be prepared by hydrosilylation reaction of polymers with terminal double bonds, for example, poly(meth)acrylate polymers or polyether polymers, for example, allyl end-capped polyoxyalkylene polymers, described, for example, in U.S. Pat. No. 3,971, 751 and U.S. Pat. No. 6,207,766, the disclosure of which is included hereby.

Suitable silane-functional polymers STP3 are commercially available, for example, under the trade names MS Polymer®, for example, as MS Polymer® S203H, S303H, S227, S810, MA903 and S943, Silyl® SAX220, SAX350, SAX400 and SAX725, Silyl® SAT350 and SAT400, as well as XMAP® SA100S and SA310S from the company Kaneka Corp., Japan as well as under the trade names Excestar® S2410, S2420, S3430, S3630, W2450 and MSX931 from the company Asahi Glass Co., Ltd., Japan.

Usually, the silane-functional polymer STP is in a quantity of 10-80 wt %, for example, in a quantity of 20-70 wt %, with respect to the total composition.

The moisture-reactive silane-functional polymer which is liquid at room temperature can be, for example, a silane-functional polyurethane polymer, for example, a silane-functional polyurethane polymer of the STP1 type or a silane-functional polymer of the STP3 type.

The moisture-reactive silane-functional polymer can have a glass transition temperature $T_G$ of $\leq -50°$ C., for example, from $-50°$ C. to $-70°$ C. The advantage of this glass transition temperature range consists, for example, of the improved properties of the composition in the low temperature range.

The composition moreover can contain at least one filler. The filler influences both the rheological properties of the uncured composition and also the mechanical properties and surface constitution of the cured composition. Suitable fillers are inorganic or organic fillers, for example, natural, ground or precipitated calcium carbonates, which are also coated with fatty acids, for example, stearic acid, barium sulfate ($BaSO_4$, also referred to as baryta or heavy spar), calcined kaolins, aluminum oxides, aluminum hydroxides, silicic acids, for example, highly dispersed silicic acids from pyrolysis processes, soots, for example, industrially produced soot (carbon black; hereafter referred to as "soot"), PVC powders or hollow beads. Exemplary fillers are calcium carbonates, calcined kaolins, soot, highly dispersed silicic acids as well as flame-inhibiting fillers, such as, hydroxides or hydrates, for example, hydroxides or hydrates of aluminum, for example, aluminum hydroxide.

It is entirely possible, and can even be advantageous to use a mixture of different fillers.

A suitable quantity of filler is, for example, in the range of 20-60 wt %, for example, 30-60 wt %, with respect to the total composition.

The exemplary composition moreover can contain at least one catalyst for crosslinking the silane-functional polymers by moisture. Such catalysts are, for example, metal catalysts in the form of organotin compounds, such as, dibutyltin dilaurate and dibutyltin diacetyl acetonate, titanium catalysts, amino group-containing compounds, for example, 1,4-diazabicyclo[2.2.2]octane and 2,2'-dimorpholinodiethyl ether, aminosilanes as well as mixtures of the mentioned catalysts.

Moreover, the exemplary composition can additionally contain other components. For example, such components are softeners, such as, esters of organic carboxylic acids or their anhydrides, such as, phthalates, for example, dioctyl phthalate, diisononyl phthalate or diisodecyl phthalate, adipates, for example, dioctyl adipate, azelates and sebacates, polyols, for example, polyoxyalkylene polyols or polyester polyols, organic phosphoric and sulfonic acid esters or polybutenes; solvents; fibers made, for example, of polyethylene; dyes; pigments; rheology modifiers, such as, thickeners or thixotropy endowing agents, for example, urea compounds of the type described as thixotropy endowing agents in WO 02/48228 A2 on pages 9-11, polyamide waxes, bentonites or pyrogenic silicic acids; adhesives, for example, epoxysilanes, (meth)acrylsilanes, anhydridosilanes or adducts of the above-mentioned silanes with primary aminosilanes, as well as aminosilanes or urea silanes; crosslinking agents, for example, silane-functional oligomers and polymers; desiccants, for example, vinyltrimethoxysilane, α-functional silanes, such as, N-(silylmethyl)-O-methyl carbamates, for example, N-(methyl dimethoxysilylmethyl)-O-methyl carbamate, (methacryloxymethyl)silanes, methoxy methylsilanes, N-phenyl-, N-cyclohexyl- and N-alkylsilanes, orthoformic acid esters, calcium oxide or molecular sieves; stabilizers, for example, against heat, light and UV radiation; flame inhibiting substances; surface-active substances, such as, crosslinking agents, eluents, aeration agents or defoaming agents; biocides, such as, algicides, fungicides or fungal growth inhibiting substances; as well as additional substances that are usually used in moisture-curing compositions.

Moreover, so-called reactive diluents can optionally be used, which are incorporated in the polymer matrix, at the time of the curing of the composition, for example, by reacting with the silane groups.

It is advantageous to select all the mentioned components optionally present in the composition, for example, filler and catalysts, in such a manner that the storage stability of the composition is not influenced negatively by the presence of such a component, which means that this composition undergoes no change or only little change during storage, in terms of its properties, for example, the application and curing properties. Consequently, reactions leading to chemical curing of the described composition, for example, reactions of the silane groups, should not occur to a significant extent during storage, in an exemplary embodiment. It is therefore can be advantageous that the mentioned components contain or release no or at most only traces of water during storage. Therefore it can be advantageous to chemically or physically dry certain components before mixing them in the composition.

The above-described composition is, for example, prepared and stored with exclusion of moisture. Typically, the composition is stable during storage, which means that it can be stored for a time period from several months to one year and longer, with exclusion of moisture, in an appropriate packaging or arrangement, such as, for example, a drum, a pouch or a cartridge, without undergoing any change, in terms of its application properties or its properties after curing, to an extent of relevance for its use. Usually, the storage stability is determined by measuring the viscosity or the push out force.

At the time of the application of the described composition to at least one solid or article, the silane groups contained in the composition come in contact with moisture. The silane groups have the properties of hydrolyzing in contact with moisture. In the process, organosilanols form, and, as a result of subsequent condensation reactions, organosiloxanes. As a result of these reactions, which can be accelerated by using catalysts, the composition finally completely cures. The process is also referred to as crosslinking.

The water needed for curing can originate either from air (atmospheric moisture), or the above-described composition can be contacted with a water-containing component, for example, by brushing, for example, with a smoothing agent, or by spraying, or a water-containing component can be added to the composition at the time of the application, for example, in the form of a water-containing paste which is mixed in, for example, using a static mixer. During the curing by atmospheric moisture, the composition cures from outside to inside. The curing rate is determined by various factors, such as, for example, the diffusion rate of the water, the temperature, the environmental moisture, and the adhesive geometry, and as a rule it decreases as the curing progresses.

In an exemplary embodiment, the composition is a moisture-curing warm or hot melt adhesive.

Here, the silane-functional polyesters of formula (I) contained in the composition, which are solid at room temperature, are melted by heating the composition. After the application of the composition in the heated state, said composition solidifies, on the one hand, during cooling by crystallization of the melt components, and, on the other hand, it crosslinks via a reaction with water. The water can here originate either from air (atmospheric moisture), or it can be added to the composition, for example, in the form of a water-containing component.

Warm melt adhesives are usually applied at temperatures of approximately 40-80° C. The application temperature of hot melt adhesives is usually higher than approximately 80° C. However, it is obviously known to the person skilled in the art that these ranges overlap, and that there is no sharp delimitation between warm and hot melt adhesives.

Warm or hot melt adhesives here are not only adhesives that are completely solid at room temperature, but also adhesives that are liquid at room temperature, but contain a melt component that is solid at room temperature.

In comparison to a pure reactive warm or hot melt adhesive, in which the entire reactive polymer component is used as melt component, such an adhesive has the advantage that it still presents a certain deformability after the application, and consequently simple corrections in case of bonding over large surface areas are still possible. In comparison to moisture-curing adhesives which contain no melt component, such an adhesive has the advantage that it has a clearly improved initial strength.

The use of the exemplary composition as warm or hot melt adhesive has the advantage that the cooling of the warm or hot applied composition to ambient temperature leads to a very advantageous increase of the initial strength of the composition.

In an exemplary embodiment, the composition is a two-component composition consisting of a component A comprising the above-mentioned composition and a component B comprising water.

For example, component A has a composition such that it can independently cure completely due to atmospheric moisture. Such a cured composition yields similar final strength values to those of the mixture of components A and B after the curing.

Component B is, for example, a water-containing paste, in which the contained water is thickened by means of at least one support material which is typically selected from the group consisting of a softener, a thickener and a filler.

The water content in component B can be varied depending on the embodiment of component A. It is obviously clear to the person skilled in the art that the quantity of the component B used depends on the water quantity contained therein. Thus, for example, if component B has a high water content of >50 wt %, then component B is usually used in a quantity of 1-10 wt % with respect to the quantity of component A. On the other hand, if component B contains, for example, only approximately 5 wt % water, component B can also be used in a quantity of approximately 50 wt % with respect to the quantity of component A.

The water content in the entire two-component composition is, for example, such that, with the water present, 50-100% of all the reactive groups in the composition can be reacted.

The two-component composition described is used, for example, in such a manner that the weight ratio of component A to component B≥1:1, for example, from 3:1 to 70:1, for example, from 10:1 to 20:1.

In the case of a two-component, moisture-curing composition, components A and B are typically stored in separate packages or in one package which has two mutually separated chambers. Component A is present here in one chamber and component B in the other chamber of the packaging. Suitable packagings are, for example, double cartridges, such as twin or coaxial cartridges, or multi-chamber tubular bags with adapter. The mixing of the two components A and B is carried out, for example, with a static mixer which can be set on the packaging with two chambers.

Such suitable packagings are described, for example, in US 2006/0155045 A1, WO 2007/096355 A1 and in US 2003/0051610 A1, the disclosures of which are incorporated herein by reference.

In a large industrial installation, the two components A and B are typically stored separately from each other in drums or hobbocks, pushed out by pressing, and mixed, for example, with toothed wheel pumps, at the time of the application. The composition can here be applied manually or in an automated process by means of a robot on a substrate.

The use of the exemplary composition as a two-component composition has the advantage that the chemical crosslinking of the silane groups in the composition occurs more rapidly by direct mixing in of the water-containing component B, and thus the buildup of strength is more rapid, and the composition cures completely more rapidly. An additional advantage is that the curing can occur independently of the atmospheric moisture of the environment.

In an exemplary embodiment, the composition is a two-component warm or hot melt adhesive. Here component A, which contains the silane-functional polyester of formula (I), which is solid at room temperature, warms, and it is mixed in the melted state with component B immediately before the application. The mixing of components A and B is again carried out typically using a static mixer.

For the use of the exemplary composition as two-component warm or hot melt adhesive, component B is, for example, used at room temperature. Due to the low proportion of component B in the total composition, the temperature difference of the two components has only a slight effect on the open time of the composition. Rather, the open time of the composition is shortened by the cooling of component A applied warm or hot.

The use of a two-component warm or hot melt adhesive combines the advantages of a two-component composition, namely rapid crosslinking and curing of the composition, independently of the atmospheric moisture, with the advantages of a warm or hot melt adhesive, which consist, for example, of the high initial strength.

Also disclosed is the use of a previously described composition as a moisture-curing adhesive, sealant or coating. The exemplary composition can be suitable as a moisture-curing adhesive for vehicle glazing.

In an additional exemplary aspect, an exemplary aspect relates to the use of an above-described composition as a moisture-curing warm or hot melt adhesive.

An example further relates to the use of the two-component composition, as described above, as a moisture-curing warm or hot melt adhesive.

The exemplary composition can be used in a method for bonding two substrates S1 and S2, comprising the steps i) application of a composition according to the above description on a substrate S1 and/or a substrate S2;

ii) contacting the substrates S1 and S2 via the applied composition within the open time of the composition; and iii) curing of the composition by water;

wherein the substrates S1 and S2 are identical or different from each other.

Moreover, the exemplary composition can also be used in a method for sealing or coating, comprising the steps i') application of a composition according to the previous description on a substrate S1 and/or between two substrates S1 and S2; and ii') curing of the composition by means of water, for example, in the form of atmospheric moisture;

wherein the substrates S1 and S2 are identical or different from each other.

If the exemplary composition is a warm or hot melt adhesive, then step i) or i') of the application for the composition is preceded by a step of heating of the adhesive, in which the polyester of formula (I) is melted as melt component.

If the exemplary composition is a two-component composition, the step i) or i') of the administration is preceded by a step of mixing of the two components A and B.

If the exemplary composition is a two-component warm or hot melt adhesive, the step i) or i') of the application of the composition is preceded by a step of heating the adhesive, for example, component A, and a step of subsequent mixing of the two components A and B.

As substrates S1 and/or S2, it is, for example, suitable to use substrates selected from the group consisting of concrete, mortar, brick, tile, gypsum, a natural rock, such as, granite or marble, glass, glass ceramic, metal or metal alloy, wood, plastic and lacquer.

The exemplary composition is applied typically by means of a suitable device on a substrate, for example, in the form of a bead, wherein said bead substantially presents a round or triangular cross-sectional surface. Suitable methods for the application of the composition are, for example, the administration from commercial cartridges which are operated manually or by a pressurized air, or from a drum or hobbock by means of a conveyance pump or an extruder, optionally by means of an application robot. An exemplary composition with good application properties has a high creeping strength and a short drawn thread. This means that after the application it remains fixed in the applied form, that is it does not flow apart, and, after the removal of the application apparatus, it leaves no or only a very short thread, so that the substrate is not soiled.

An example relates moreover to a cured composition, which can be prepared by reacting an above-described composition with water, for example, in the form of atmospheric moisture.

The articles that are bonded, sealed or coated with an exemplary composition consist, for example, of an industrially manufactured product, a consumer product, for example, a window, a domestic appliance, or a transport means, for example, a vehicle, or an attached part of a vehicle.

EXAMPLES

Below, exemplary embodiments are listed which provide further details. The invention is not limited to the described embodiments.

Test Procedures

The tensile strength, the elongation at rupture, and the modulus of elasticity (E modulus) at 0-5% elongation were determined according to DIN EN 53504 (traction speed: 200 mm/min) on films with a layer thickness of 2 mm, which had been cured for 7 days at 23° C. and 50% relative atmospheric moisture.

The Shore A hardness was determined according to DIN 53505, on sample bodies with a layer thickness of 6 mm, which had been cured for 7 days at 23° C. and 50% relative atmospheric moisture.

The initial strength of the composition was determined by means of the slip down behavior of the adhesive under static load. For this purpose, a triangular adhesive bead (width: 10 mm; height: 12 mm) was applied at a temperature of 70° C. horizontally on a vertically positioned glass sheet, pressed in to 5 mm after 30 seconds with a glass test specimen (100× 40×6 mm) weighing 120 g over the entire width of 40 mm of the largest surface of the glass test specimen (corresponds to 30 g/cm), and held in position for 30 seconds. Then, the fixing was loosened, and the slip down distance ("slip down") of the glass body was measured after 2 minutes. Compositions having a slip down distance of 0.5 mm or more present insufficient initial strength.

The shear modulus was determined according to DIN 54451, wherein two aluminum test specimens (70×25×5 mm), which had been pretreated with Sika® Primer-204 N (available from Sika Schweiz AG), were bonded over a surface of 10×25 mm with an adhesive layer thickness of 1.75 mm, and cured for 7 days at 23° C. and 50% relative atmospheric moisture. Subsequently, the test specimens were pulled apart at a rate of 10 mm/min. The shear modulus was measured at 10% slippage.

Preparation of the Melt Components

SKomp.1: 3600 g Dynacoll® 7381 (Evonik Degussa GmbH, Germany, crystalline polyester, $M_n$=3500 g/mol, OH number 29.6) and 400 g diisodecyl phthalate (DIDP, Palatinol® Z, BASF SE, Germany) were stirred for 1 hour at 120° C. in a vacuum, to remove any water present. The mixture was then cooled to 90° C., and the vacuum was broken with nitrogen. Under a nitrogen atmosphere, 390.66 g 3-isocyanatopropyltrimethoxysilane (Geniosil® GF-40, Wacker Chemie AG, Germany) and 5.28 g di-n-butyltin dilaurate (Metatin® K 712, Acima AG, Switzerland) were mixed in, and the stirring was continued at 90° C. until no free isocyanate groups were detected by titrimetry. SKomp.1 is solid at room temperature.

SKomp.2: 1188 g Dynacoll® 7381 and 111.11 g diisodecyl phthalate (Palatinol® Z) were stirred for 1 hour at 120° C. in a vacuum, to remove any water present. The mixture was then cooled to 90° C., and the vacuum was broken with nitrogen. Under a nitrogen atmosphere, 129.25 g isophorone diisocyanate (Vestanat® IPDI, Evonik Degussa GmbH), and 0.99 g di-n-butyltin dilaurate (Metatin® K 712) were mixed in, and the stirring was continued at 90° C. until a constant content of free isocyanate groups of 1.35 wt % was determined by titrimetry. Subsequently, 164.83 g N-(3-trimethoxysilylpropyl) aminosuccinic acid diethyl ester were added, and the stirring was continued until no free isocyanate groups were detected by titrimetry.

N-(3-Trimethoxysilylpropyl)aminosuccinic acid diethyl ester was prepared as follows: the starting material consisted of 90.33 g 3-aminopropyl trimethoxysilane (Silquest® A-1110, Momentive Performance Materials Inc., USA). Under appropriate stirring, 86.75 g maleic acid diethyl ester (Fluka Chemie GmbH, Switzerland) were slowly added at room temperature, and the mixture was stirred for 2 hours at room temperature. SKomp.2 is solid at room temperature.

Preparation of the Silane-Functional Polyurethane Polymer SH

Under a nitrogen atmosphere, 1000 g Polyol Acclaim® 12200 (Bayer MaterialScience AG, Germany; low monol polyoxypropylenediol; OH number 11.0 mg KOH/g; water content approximately 0.02 wt %), 46.17 g isophorone diisocyanate (Vestanat® IPDI), 261.72 g diisodecyl phthalate (Palatinol® Z), and 0.14 g di-n-butyltin dilaurate (Metatin® K 712) were heated under continuous stirring to 90° C., and left at this temperature. After a reaction time of one hour, a free content of isocyanate groups of 0.70 wt % was reached by titration. Subsequently, 69.88 g N-(3-trimethoxysilylpropyl) aminosuccinic acid diethyl ester were added, and the stirring was continued at 90° C. for an additional 2-3 hours. The reaction was stopped as soon as no free isocyanate was detected by IR spectroscopy (2275-2230 $cm^{-1}$). The product was cooled to room temperature (23° C.) and stored with exclusion of moisture (theoretical polymer content=90%). SH is liquid at room temperature.

Preparation of the Adhesives

In a vacuum mixer, in accordance with the weight parts indicated in Table 1, a silane-functional polymer which is liquid at room temperature, diisodecyl phthalate (Palatinol® Z), and vinyltrimethoxysilane (Silquest® A-171 from Momentive Performance Materials Inc., USA) were thoroughly mixed for 5 minutes. Subsequently, dried precipitated calcium carbonate (Socal® U1S2, Solvay SA, Belgium) and dried soot (Monarch® 570 from Cabot Corp., USA) as well as the melt components (SKomp.1, SKomp.2, PEG 2000, Dyn 7381) which had been melted beforehand for 2 days in an oven at 70° C., were kneaded together for 15 minutes at 60° C. With the heater switched off, N-(2-aminoethyl)-(3-aminopropyl)trimethoxysilane (Silquest® A-1120 from Momentive Performance Materials Inc.) and catalyst (Metatin® K740 or Metatin® K712 as 10% solution in DIDP) were then processed in a vacuum for 10 minutes to a homogeneous paste. The latter was then filled into internally lacquered aluminum spreader piston cartridges.

TABLE 1

Composition of the exemplary adhesives 1-5 and of the reference examples Ref1-Ref7 in wt %.

| | 1 | 2 | Ref1 | Ref2 | Ref3 | 3 | 4 | Ref4 | Ref5 | Ref6 | 5 | Ref7 |
|---|---|---|---|---|---|---|---|---|---|---|---|---|
| SH | 50 | 50 | 50 | 50 | 50 | | | | | | | |
| S303H [a] | | | | | | 50 | 50 | 50 | 50 | 50 | | |
| STP-E30 [c] | | | | | | | | | | | 50 | 50 |
| Palatinol ® Z | 5.5 | 5.5 | 5.5 | 5.5 | 9.5 | 6.8 | 6.8 | 6.8 | 6.8 | 10.8 | 8.95 | 8.95 |
| Silquest ® A-171 | 1 | 1 | 1 | 1 | 1 | 1 | 1 | 1 | 1 | 1 | 1 | 1 |
| Socal ® U1S2 | 20 | 20 | 20 | 20 | 20 | 20 | 20 | 20 | 20 | 20 | 18 | 18 |
| Monarch ® 570 | 17 | 17 | 17 | 17 | 17 | 17 | 17 | 17 | 17 | 17 | 17 | 17 |
| SKomp.1 | 4 | | | | | 4 | | | | | 4 | |
| SKomp.2 | | 4 | | | | | 4 | | | | | |
| PEG 2000 [d] | | | 4 | | | | | 4 | | | | |
| Dyn 7381 [e] | | | | 4 | | | | | 4 | | | 4 |
| Silquest ® A-1120 | 1 | 1 | 1 | 1 | 1 | 1 | 1 | 1 | 1 | 1 | 1 | 1 |
| Metatin ® K740 | | | | | | 0.2 | 0.2 | 0.2 | 0.2 | 0.2 | | |
| Metatin ® K712 [f] | 1.5 | 1.5 | 1.5 | 1.5 | 1.5 | | | | | | 0.05 | 0.05 |

[a] S303H: MS Polymer S303H, Kaneka Corp., Japan;
[b] 3200HM: SPUR+ 3200HM, Momentive Performance Materials Inc., USA;
[c] STP-E30: Geniosil ® STP-E30, Wacker Chemie AG, Germany;
[d] PEG 2000: Polyethylenglykol 2000, Fluka Chemie GmbH, Switzerland;
[e] Dyn 7381: Dynacoll ® 7381, Evonik Degussa GmbH, Germany;
[f] 10% solution in DIDP.

TABLE 2

|  | 1 | 2 | Ref1 | Ref2 | Ref3 | 3 | 4 | Ref4 | Ref5 | Ref6 | 5 | Ref7 |
|---|---|---|---|---|---|---|---|---|---|---|---|---|
| Tensile strength [Mpa] | 5.6 | 5.7 | 4.1 | 4.0 | 6.1 | 4.7 | 4.8 | 3.7 | 4.2 | 5.4 | 5.4 | 4.2 |
| E modulus 0-5% [MPa] | 14.7 | 13.7 | 12.1 | 14.0 | 6.3 | 6.6 | 7.4 | 7.2 | 6.8 | 3.5 | 12.9 | 14.1 |
| Elongation rupture [%] | 240 | 252 | 189 | 168 | 300 | 269 | 275 | 229 | 251 | 291 | 279 | 214 |
| Shore A | 71 | 71 | 67 | 70 | 59 | 58 | 61 | 58 | 58 | 51 | 70 | 71 |
| Slip down [mm] | 0 | 0 | 0 | 0 | 3.3 | 0 | 0 | 1.2 | 1.1 | 3.3 | 0 | n.d. |

Results of the compositions from Table 1;
Reference examples Ref3 and Ref6 contain no melt component;
The slip down distance (slip down) of Ref7 could not be determined, because the high viscosity of Ref7 made the application with the cartridge impossible.

TABLE 3

|  | 1A | 1B | 1C | 1D |
|---|---|---|---|---|
| SH | 50 | 50 | 50 | 47.5 |
| Palatinol ® Z | 9 | 5.5 | 3.5 | 0 |
| Silquest ® A-171 | 1 | 1 | 1 | 1 |
| Socal ® U1S2 | 20 | 20 | 20 | 20 |
| Monarch ® 570 | 17 | 17 | 17 | 17 |
| SKomp.1 | 0.5 | 4.0 | 6.0 | 12.0 |
| Silquest ® A-1120 | 1 | 1 | 1 | 1 |
| Metatin ® K712[a)] | 1.5 | 1.5 | 1.5 | 1.5 |
| Tensile strength [MPa] | 5.38 | 5.27 | 5.39 | 5.63 |
| Elongation at rupture [%] | 250 | 224 | 212 | 166 |
| Slip down [mm] | 1 | 0 | 0 | 0 |
| Shear modulus [MPa] | 1.99 | 3.92 | 6.12 | 10.56 |

Adhesive compositions in wt % with different proportion of melt component and results.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition, comprising:
   i) at least one moisture-reactive silane-functional polymer which is liquid at room temperature; and
   ii) at least one silane-functional polyester of formula (I):

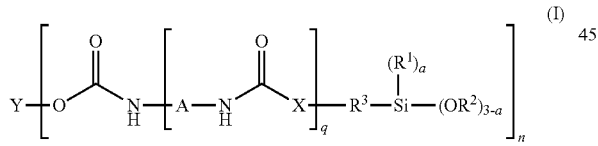

wherein
Y stands for an n-valent residue of a polyester P which is solid at room temperature and terminated by hydroxyl groups, after removal of n hydroxyl groups;
$R^1$ stands for a linear or branched, monovalent hydrocarbon residue having 1-12 C atoms, which optionally presents one or more C—C multiple bonds and/or optionally cycloaliphatic and/or aromatic portions;
$R^2$ stands for an acyl residue or for a linear or branched, monovalent hydrocarbon residue having 1-12 C atoms, which optionally comprises one or more C—C multiple bonds and/or optionally cycloaliphatic and/or aromatic portions;
$R^3$ stands for a linear or branched, bivalent hydrocarbon residue having 1-12 C atoms, which optionally comprises cyclic and/or aromatic portions, and optionally one or more heteroatoms;

the variable a stands for a value of 0, 1 or 2;
the variable n stands for a value of 1-3;
A stands for a bivalent residue of a diisocyanate after removal of the two isocyanate groups;
the variable q stands for a value of 0 or 1; and
X stands for S or for $NR^5$
wherein
$R^5$ stands for a hydrogen atom or for a linear or branched, monovalent hydrocarbon residue having 1-20 C atoms, which optionally comprises cyclic portions, or for a residue of formula (II):

$R^6$ and $R^7$, independently of each other, stand for a hydrogen atom or for a residue selected from the group consisting of —$R^{11}$, —COO$R^{11}$ and —CN; and
$R^8$ stands for a hydrogen atom or for a residue selected from the group consisting of —$CH_2$—COO$R^{11}$, —COO$R^{11}$, CONH$R^{11}$, —CON($R^1$)$_2$, —CN, —NO$_2$, —PO(O$R^{11}$)$_2$, —SO$_2R^{11}$ and —SO$_2$O$R^{11}$, and
$R^{11}$ stands for a hydrocarbon residue having 1-20 C atoms, which optionally comprises one or more heteroatoms,
wherein the proportion of silane-functional polyester of formula (I) is 0.5-8 wt % of the total composition.

2. The composition according to claim 1, wherein the polyester P is a crystalline polyester.

3. The composition according to claim 2, wherein the crystallization point of the polyester P is less than 30° C. below the melting point of the polyester P.

4. The composition according to claim 1, wherein the polyester P has a mean molecular weight Mn of 2000 g/mol to 7000 g/mol.

5. The composition according to claim 1, wherein q stands for a value of 0.

6. The composition according to claim 1, wherein a stands for a value of 0 or 1.

7. The composition according to claim 1, wherein n stands for a value of 2.

8. The composition according to claim 1, wherein $R^2$ stands for an acyl or alkyl group having 1-5 C atoms.

9. The composition according to claim 1, wherein $R^3$ stands for an alkylene residue having 1-3 C atoms.

10. The composition according to claim 1, wherein the moisture-reactive silane-functional polymer which is liquid at room temperature is a silane-terminated polyurethane polymer.

11. A method for bonding two substrates S1 and S2, the method comprising:
   i) applying the composition according to claim 1 on a substrate S1 and/or a substrate S2;
   ii) contacting the substrates S1 and S2 via the applied composition within an open time of the composition; and
   iii) curing the composition with water,
   wherein the substrates S1 and S2 are identical to or different from each other.

12. The method of claim 11, wherein the composition is a moisture-curing warm- or hot-melt adhesive, and wherein the method further comprises heating the composition prior to step i) to melt the polyester of formula (I).

13. A method for bonding, sealing or coating, the method comprising:
   i) applying the composition according to claim 1 on a substrate S1 and/or between two substrates S1 and S2; and
   ii) curing the composition with water,
   wherein the substrates S1 and S2 are identical to or different from each other.

14. The method of claim 13, wherein the method is for vehicle glazing.

15. The method of claim 13, wherein the composition is a moisture-curing warm- or hot-melt adhesive, and wherein the method further comprises heating the composition prior to step i) to melt the polyester of formula (I).

16. A two-component composition, comprising:
   a component A comprising a composition according to claim 1; and
   a component B comprising water.

17. The composition according to claim 1, wherein the polyester P has a mean molecular weight Mn of 2500 g/mol to 6500 g/mol.

18. The composition according to claim 1, wherein the polyester P has a mean molecular weight Mn of 3000 g/mol to 4000 g/mol.

19. The composition according to claim 1, wherein $R^2$ stands for a methyl or for an ethyl or for an isopropyl group.

20. The composition according to claim 1, wherein $R^3$ stands for an alkylene residue having 3 C atoms.

21. The composition according to claim 1, wherein the proportion of silane-functional polyester of formula (I) is 0.5-6 wt % of the total composition.

* * * * *